(12) United States Patent
Mueller et al.

(10) Patent No.: US 7,844,817 B2
(45) Date of Patent: Nov. 30, 2010

(54) ENSURING QUALITY OF SERVICE IN A COMMUNICATIONS NETWORK

(75) Inventors: Harald Mueller, Munich (DE); Juergen Totzke, Poing (DE)

(73) Assignee: Siemens Aktiengesellschaft, Munich (DE)

( * ) Notice: Subject to any disclaimer, the term of this patent is extended or adjusted under 35 U.S.C. 154(b) by 1566 days.

(21) Appl. No.: 10/225,212

(22) Filed: Aug. 20, 2002

(65) Prior Publication Data

US 2003/0163736 A1 Aug. 28, 2003

(30) Foreign Application Priority Data

Feb. 28, 2002 (DE) ............................... 102 08 749

(51) Int. Cl.
  H04L 29/06 (2006.01)
  H04L 9/32 (2006.01)
  G06F 21/00 (2006.01)
  G06F 17/00 (2006.01)
  G06F 7/04 (2006.01)

(52) U.S. Cl. ...................... 713/166; 713/168; 713/182; 726/1; 726/2; 726/3; 726/4; 726/27

(58) Field of Classification Search ................ 713/189, 713/166, 168, 182; 726/1–4, 27
See application file for complete search history.

(56) References Cited

U.S. PATENT DOCUMENTS

| | | | | |
|---|---|---|---|---|
| 6,078,956 A * | 6/2000 | Bryant et al. | ............... | 709/224 |
| 6,104,700 A * | 8/2000 | Haddock et al. | ............ | 370/235 |
| 6,282,575 B1 * | 8/2001 | Lin et al. | .................... | 709/244 |
| 6,307,836 B1 * | 10/2001 | Jones et al. | ................. | 370/230 |
| 6,363,429 B1 * | 3/2002 | Ketcham | .................... | 709/235 |
| 6,466,984 B1 * | 10/2002 | Naveh et al. | ................. | 709/228 |

(Continued)

FOREIGN PATENT DOCUMENTS

WO   WO 99/27686 A1   11/1998

(Continued)

OTHER PUBLICATIONS

ETSI TS 101 329-3 v2.1.2: Telecommunications and Internet Protocol Harmonization Over Networks (TIPHON) Release 3; End-to-end Quality of Service (QoS); European Telecommunications Standards Institute, Sophia-Antipolis, France; Bd. TIPHON-5, Nr. V212, Jan. 2002, pp. 1-45, document XP014006057.

*Primary Examiner*—Nasser Moazzami
*Assistant Examiner*—Mohammad W Reza
(74) *Attorney, Agent, or Firm*—King & Spalding L.L.P.

(57) ABSTRACT

A network access device checks communication data flows coming into a network for specific authorization information. The quality of service class (QOS) with which a flow is retransmitted from the network access device through the network is determined by the result of the check. Each end device that transmits a flow to the network access device can first request authorization for the flow from a gate keeper and resource manager mechanism of the network. The mechanism returns specific authorization information which the end device includes in the flow before the flow is transmitted to the network access device. In one embodiment, only if an incoming flow is determined to have the specific authorization information will the network access device allow the flow to be retransmitted through the network with a particular quality of service (QOS) class.

21 Claims, 1 Drawing Sheet

U.S. PATENT DOCUMENTS

| | | | |
|---|---|---|---|
| 6,483,912 B1 * | 11/2002 | Kalmanek et al. | 379/219 |
| 6,578,076 B1 * | 6/2003 | Putzolu | 709/223 |
| 2002/0004399 A1 | 1/2002 | McDonnell et al. | 455/456 |
| 2002/0013844 A1 * | 1/2002 | Garrett et al. | 709/225 |
| 2002/0016855 A1 * | 2/2002 | Garrett et al. | 709/238 |
| 2002/0110123 A1 * | 8/2002 | Shitama | 370/389 |
| 2003/0028625 A1 * | 2/2003 | Sanjeev et al. | 709/220 |
| 2003/0065917 A1 * | 4/2003 | Medvinsky et al. | 713/160 |

FOREIGN PATENT DOCUMENTS

| | | | |
|---|---|---|---|
| WO | WO 0135680 A1 * | 5/2001 | |

* cited by examiner

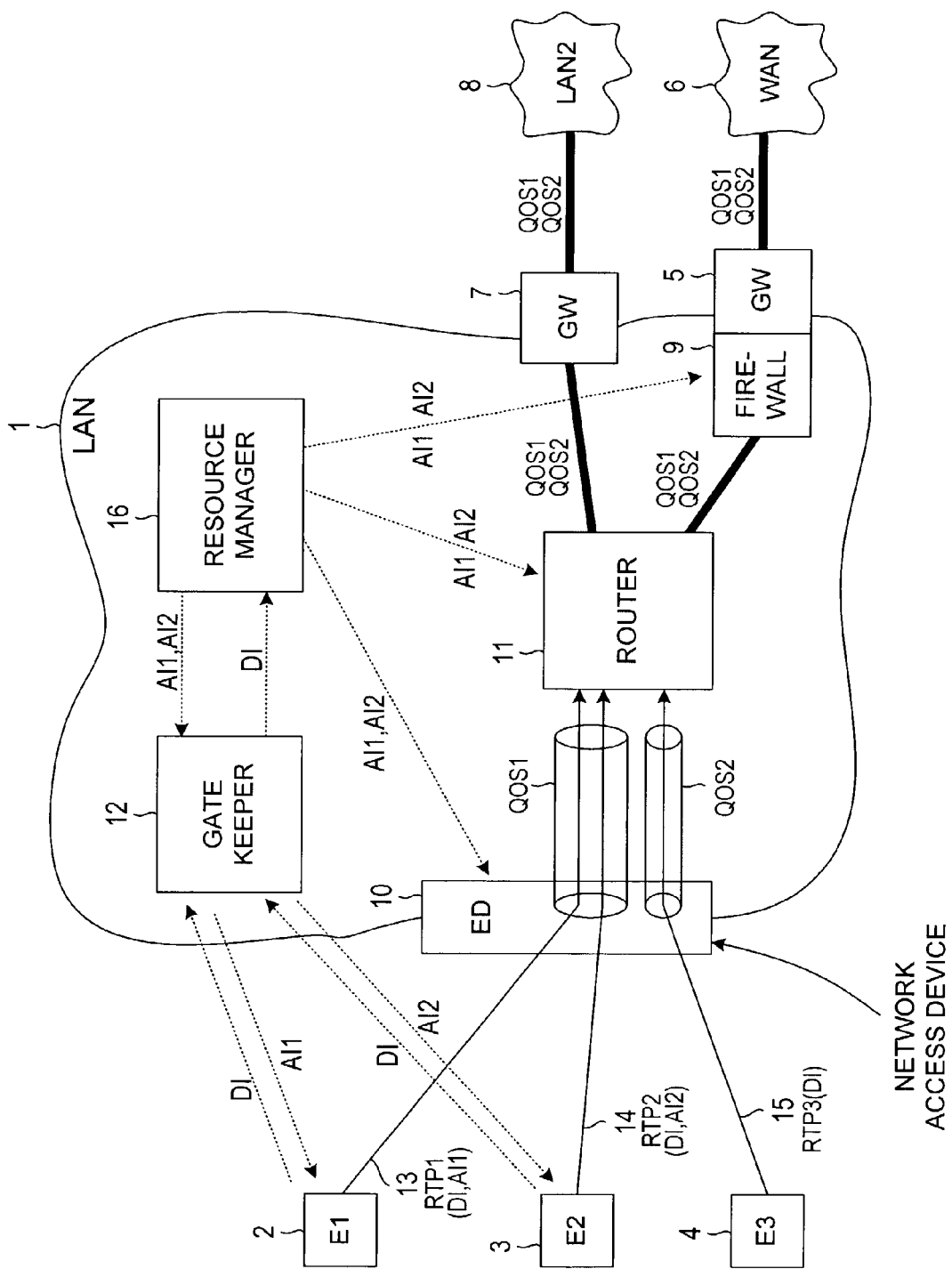

ENSURING QUALITY OF SERVICE IN A COMMUNICATIONS NETWORK

CROSS REFERENCE TO RELATED APPLICATION

This application is based on and hereby claims priority to German Application No. 102 08 749.0 filed on Feb. 28, 2002, in Germany, the contents of which are incorporated herein by reference.

TECHNICAL FIELD

The present invention relates to ensuring quality of service in a communications network.

BACKGROUND

In modern communication systems, communication connections (for example, communication connections for the transmission of speech, video or multimedia information) are increasingly transmitted via packet-oriented communication networks, such as local area networks (LAN) or wide area networks (WAN). For example, internet telephony commonly referred to as VoIP (voice/video over internet protocol) is based on this technology.

An important feature of a communication connection is its service quality. The service quality of a communication connection is frequently also referred to as quality of service (QOS) and can refer to various transmission or connection properties, such as the transmission bandwidth, the transmission error rate, a transmission delay or other transmission or service quality resources.

To ensure a prescribed service quality, devices called resource managers are frequently deployed. A resource manager is included in a communication network or a part of a network and administers the network's transmission or service quality resources. Through the resource manager, prescribed transmission resources and service quality resources, which are usually structured into service quality classes or traffic classes, can be reserved for a particular connection. For reserving a transmission or service quality resource, a service quality request is transmitted to the resource manager by an end device. The resource manager then checks the availability of the requested transmission or service quality resource and, depending on the availability, either permits the requested connection or rejects it.

Once the connection has been permitted, the end device can transmit a communication data flow of the assigned service quality class to the network access device of the communication network. The network access device assigns the communication data flow to the requested service quality class and transmits it in the service quality class through the communication network.

Because a communication network also frequently transmits connections from network-external end devices or communication applications, the arrival at the end device of a communication data flow from a transmission that has not been approved by the resource manager cannot, in general, be excluded. In order to prevent such a communication data flow from having a service quality that was elsewhere assigned to it, and therefore illegitimately using bandwidth, the currently used known methods ensure the service quality by carrying out an analysis of the signaling protocol by the network access device.

Such a protocol analysis, however, requires status-dependent and context-dependent administration of all the data packets arriving that are associated with connections. This administration is both costly and susceptible to errors. A less costly and less error-prone method is sought for ensuring desired service quality for communication data flows in a communications network.

SUMMARY

Service quality information and specific authorization information are transmitted with a communication data flow. The communication data flow is transmitted to a network access device of a communication network (for example, from a communication end device), a communication application or a communication client. The network access device can, for example, be a network interface device, a gateway, an edge device, a switch, a router or a firewall. The transmitted specific authorization information in the communication data flow is checked by the network access device, and depending on the test result, the communication data flow is allocated to the service quality class according to the service quality information. The communication data flow passes through the network access device and is transmitted through the communication network.

The network access device can thereby easily determine from the authorization information whether an arriving communication data flow is approved or authorized for the service quality class identified by the service quality information. The network access device need not perform any status-dependent or context-dependent administration of arriving data packets.

According to an embodiment, a communication device that transmits a communication data flow to the network first sends a service quality request to a resource manager of the network. The resource manager administers service resources of the network and responds to the request by sending authorization information to the communication device. The resource manager transmits a confirmation message along with the authorization information confirming receipt of the service quality request. The resource manager thereby either statically or dynamically assigns authorization information to communication devices.

In another embodiment, the resource manager also transmits the authorization information to the network access device, so that the incoming communication data flow from the communications device can easily be verified on the network access device with the authorization information. The communication data flow is verified by the network access device if the authorization information in the communication data flow matches the authorization information received from the resource manager. The authorization information can also be transmitted to further network devices in the network (for example, to a firewall in the path of the communication data flow) by the resource manager or from the network access device. In this way, other network devices on the network can also easily check the authorization.

Moreover, the resource manager can also send modified authorization information that depends on a modification of currently requested and available service quality resources. For example, if during the time a connection exists the available service quality resources are changed, correspondingly changed authorization information can be assigned dynamically. Depending on the modified authorization information, the network access device can allocate a different service quality class to the communication data flow or it can modify the method of transmission.

In another embodiment, after a communication data flow is stopped for being illegitimate, the authorization information in the communication data flow is noted as invalid. A later illegitimate use of the assigned authorization information is thereby prevented.

According to an additional embodiment, service quality-specific, data flow-specific and communication device-specific authorization information can be transmitted and can be checked by the network access device specifically with respect to the service quality, the data flow and the communication device. Thus, it is possible to allocate connection-specific, call-specific and end device-specific authorization information. For example, it is possible to assign fixed authorization information to a secure end device.

In a further embodiment of the invention, the authorization information is transmitted from the resource manager to the communication device after coding by means of a secure, coded transmission protocol. In this way, illegitimate use of authorization information by a non-authorized communication device is prevented. Instead of the authorization information, a signature key can be transmitted from the resource manager to the communication device and the network access device. The communication device then encrypts the authorization information to be transmitted by combining the received signature key information with the data to be transmitted to the network access device. The signature key information can be combined with one or several of the fields in the corresponding packet header of a data packet to be transmitted to the network access device. The network access device then checks the transmitted authorization information independently, making use of the transmitted signature key it has received itself. To increase the security further, time information (for example, a time stamp in a packet header) is included in the encryption of the authorization information.

In one embodiment, the authorization information is transmitted within a packet header or within an extension to the packet header of a data packet of the communication data flow. In particular, a flag in the packet header can indicate whether the packet header or the extension to the packet header includes authorization information. The authorization information can be transmitted in a standardized packet header extension of the RTP (real time protocol). An advantage is that by authorizing the communication data flow according to RTP, a data flow using RTCP (real time control protocol) that is correlated to the communication data flow can also be authorized.

In another embodiment, the service quality information transmitted together with the communication data flow is overwritten depending on the check of the authorization information. In this way, the service quality information of a communication data flow that has been identified as unauthorized by the network access device is modified so that, even in the path of subsequent network devices where the method of the embodiment is not installed, no unauthorized service classes are assigned.

Other systems, devices and methods are described in the detailed description below. This summary does not purport to define the invention. The invention is defined by the claims.

BRIEF DESCRIPTION OF THE DRAWINGS

The FIGURE is a simplified diagram of a communication system with several end devices connected to the communication network in accordance with an embodiment of the present invention.

DETAILED DESCRIPTION

The FIGURE shows schematically a communication system with a local network LAN 1 to which several end devices 2, 3 and 4 are connected. In the illustrated example, LAN 1 is a packet-oriented communication network that transmits speech, video and multimedia communications according to recommendations H.323 from the ITU. Alternatively the IETF standard protocol SIP (session initiation protocol) for speech, video and multimedia information can be implemented in LAN 1. LAN 1 is connected through a network interface 5 to a wide traffic network WAN 6 (WAN 6 can be the internet) and through a further network interface 7 to a second LAN 8. To secure LAN 1 from unauthorized access from WAN 6, the network interface 5 is equipped with a firewall device 9.

In the example shown, end devices 2, 3 and 4 are connected through a network access device (ED) 10 of LAN 1. Network access device 10 is sometimes called an edge device. End devices 2, 3 and 4, in this example, can be personal computers, communication applications, communication clients or end devices for speech, video and multimedia communication.

LAN 1 includes a router 11 for data packet transmission, in particular between the network access device 10 and network interfaces 5 and 7. LAN 1 further includes a gate keeper 12 for connection control as specified in the H.323 recommendations. Network access device 10 provides a network access for external communication equipment, in this case end devices 2, 3 and 4. In the present example, each of end devices 2, 3 and 4 establishes one communication connection to LAN 1. In the context of these communication connections, a first communication data flow 13 (RTP1) is transmitted to network access device 10 by end device 2, a second communication data flow 14 (RTP2) is transmitted to network access device 10 by end device 3, and a third communication data flow 15 (RTP3) is transmitted to network access device 10 by end device 4. In the present example, the three communication data flows 13, 14 and 15 are transmitted using RTP (real time protocol) by means of so-called RTP data packets.

Network access device 10 allocates (assigns) each of communication data flows 13, 14 and 15 from end devices 2, 3 and 4 to a specific service quality class. In the present example, there are two service quality classes QOS1 and QOS2. Network access device 10 in turn transmits each of communication data flows 13, 14 and 15 in its assigned service quality class to router 11. The different service quality classes QOS1 and QOS2 both exhibit a specific transmission behavior (per hop behavior), and they have specific service quality resources allocated to them. For the example shown, it is assumed that the service quality class QOS1 guarantees a transmission bandwidth sufficient for real time transmission of the communication data flows, while the service class QOS2 provides a lower priority transmission which does not affect the transmission resources of service quality class QOS1.

Also, a further data transmission from router 11 via network device 5 into WAN 6, or by router 11 via network interface device 7 into LAN 8 is based, as indicated by thicker lines in the FIGURE, on the service quality classes QOS1 and QOS2. No further service quality classes are considered in addition to the service quality classes QOS1 and QOS2 in the present example, in order to keep the example easy to understand.

Service quality class QOS1 is managed in LAN 1 by a resource manager 16. Resource manager 16 monitors, in particular, the currently available service quality resources in service quality class QOS1 (for example, the currently available transmission bandwidth). Resource manager 16 is coupled to gate keeper 12 by means of a signaling protocol. The exchange of signaling information between resource manager 16 and end devices 2, 3 and 4 is organized via gate keeper 12. Their signaling traffic is indicated by dotted arrows.

For the setting up of communication connections from end devices 2 and 3, each of end devices 2 and 3 transmits service quality information (DI) within a "service quality request" via gate keeper 12 to resource manager 16. The service quality information DI can, for example, concern requirements in bandwidth or the connection or media type for the connection to be set up.

In the present example, both of end devices 2 and 3 transmit the same service quality information DI. End devices 2 and 3 are therefore both requesting service quality class QOS1 for their communication connections. In contrast, in the present example, end device 4 does not transmit service quality information to resource manger 16 (for example, because the signaling protocol used for this purpose has not been implemented on end device 4, or because end device 4 ignores it).

After receiving the service quality request messages, resource manager 16 checks the availability of the requested service quality along the path to be expected for each of the communication connections. If the requested service quality is available, then the correlated communication connection is "permitted" by resource manager 16; if not, it is rejected. If the communication connection is permitted, then resource manager 16 transmits authorization information via gate keeper 12 to the communication equipment that initiated the communication connection. In the example presented, the communication connections initiated by end devices 2 and 3 are permitted. Resource manager 16 therefore sends first authorization information (AI1) to end device 2 and second authorization information (AI2) to end device 3. The first authorization information AI1 and the second authorization information AI2 are assigned by resource manager 16 dynamically either connection-specifically or service quality-specifically. The corresponding authorization information AI1 or AI2 is preferably issued together with the confirmation message for the service quality requests on the signaling level to the appropriate end device 2 or 3. Authorization information messages AI1 and AI2 are transmitted in parallel from resource manager 16 to network access device 10, to router 11, and to firewall 9.

Because the third end device 4 has not sent a "service quality request" to resource manager 16, the third end device 4 in the present example has no authorization information available. The communication data flow RTP3 from the third end device 4 is therefore not authorized for any service quality class.

After receiving the authorization information messages AI1 and AI2, the end devices 2 and 3 transmit the communication data flows 13 (RTP1) and 14 (RTP2) to network access device 10. With the appropriate communication data flow 13 (RTP1) or 14 (RTP2), the service quality information DI and the corresponding authorization information AI1 or AI2 is transmitted.

This authorization information AI1 or AI2 is preferably transmitted in a standardized packet header extension for every RTP data packet in the corresponding communication data flow 13 (RTP1) or 14 (RTP2). In conformity with the RTP, the existence of a packet header extension is indicated by a flag, the so-called x-flag, within the normal packet header of the RTP data packet. The standardized packet header extension includes an identifier (extension identifier), a length field, and a content field. An identifier can be registered with a central organization responsible for this. Authorization information AI1 and AI2 can be transmitted in the content field of the packet header extension. Alternatively, the identifier itself can be used as the authorization information. In this case, the length field is set to 0. The identifier used as authorization information can, for example, be used for identifying trustworthy data sources. This very simple identification of trustworthy data sources often makes the identification of trustworthy data sources possible without the costly implementation of so-called Token Bucket filters in network access device 10, the network interfaces 7 and 5, or the firewall 9.

In contrast to the first and second end devices 2 and 3, the third end device 4 transmits no authorization information with the communication data flow 15 (RTP3) that it transmits to network access device 10. Rather, third end device 4 only transmits the service quality information (DI). The service quality information (DI) implicitly requests the service quality class QOS1 for communication data flow 15 (RTP3).

In network access device 10, all arriving communication data flows 13, 14 and 15 from end devices are checked to see whether authorization information has been transmitted with them. In addition, the value of each piece of transmitted authorization information AI1 or AI2 is checked. In one embodiment, different values for the authorization information are very efficiently evaluated by a hash table. After the check has been performed, the communication data flows 13, 14 and 15 are re-transmitted to router 11, depending on the result of the check of the service quality class (in this case, QOS1 or QOS2).

In the example presented, the authorization information AI1 that was transmitted with communication data flow 13 is compared by network access device 10 with the authorization information AI1 as received from resource manager 16 and the comparison indicates they are identical. Similarly, the authorization information AI2 that was transmitted with communication data flow 14 is compared by network access device 10 with the authorization information AI2 as received from resource manager 16 and the comparison indicates they are identical. Because the authorization information is identical, the corresponding communication data flows 13 and 14 are assigned the service quality class QOS1 implicitly requested by the included service quality information DI, and the communications data flows 13 and 14 are re-transmitted to router 11 using this class.

In the case of communication data flow 15 (RTP3), however, network access device 10 finds no authorization information. Consequently, the communication data flow 15 (RTP3) is not allocated to the service quality class QOS1 implicitly requested by the service quality information DI included. Rather, communication data flow 15 (RTP3) is assigned to the lower priority service quality class QOS2. By allocating communication data flow 15 (RTP3) to QOS2, the transmission resources for the QOS1 are not reduced, thus these transmission resources are available to the authorized communication data flows 13 and 14.

Communication data flow 15 (RTP3) is re-transmitted by network access device 10 with (or having) QOS2 to router 11. At the same time, modified service quality information (not shown) is sent to router 11 with communication data flow 15 (RTP3). With the modified service quality information, the service quality class QOS2 is requested implicitly. This method effectively prevents unauthorized communication data flows such as flow 15 (RTP3) from being allocated service quality resources illegitimately by network devices which do not operate using the method described in the invention.

By means of the authorization information AI1 and AI2 transmitted with the communication data flows 13 and 14, not only network access device 10 but also router 11 and firewall 9 are easily able to distinguish authorized communication data flows 13 and 14 from unauthorized data flows, such as flow 15 in this example. The check described here can be made by means of a non-status check on the basis of every single RTP data packet so that the check requires considerably less time than current methods involving status or context processing. A requested service quality or a requested service is only provided to authorized communication data flows, in this example 13 and 14. In particular, this method rejects service quality requests from data sources which do not correctly support the data protocol or which abuse it. In this way, the service quality resources of the service quality classes administered by the resource manager RM are not illegitimately also used by unauthorized data flows.

In accordance with one embodiment, instead of the authorization information AI1 or AI2, specific signature key information is sent by resource manager 16 to the appropriate end device 2 or 3. The actual authorization information AI1 or AI2 is then decrypted by the corresponding end device 2 or 3 by combining the signature key information with the field in the packet header of the appropriate RTP packet. The two values may, for example be hashed together. A current time stamp is preferably also included in this calculation.

Finally, it is to be noted that network interface devices 5 and 7, router 11, and firewall 9 can be considered, depending on viewpoint, as network access devices for the networks LAN2 8, WAN 6 or LAN 1. The check of authorization information according to the invention can be carried out in each of the listed network devices 5, 7, 11, 9 and, depending on the result, the communication data flow can be assigned a service quality class and a path.

Although the present invention has been described in connection with certain specific embodiments for instructional purposes, the present invention is not limited thereto. Various modifications, adaptations, and combinations of various features of the described embodiments can be practiced without departing from the scope of the invention as set forth in the claims.

What is claimed is:

1. A method, comprising:
   receiving at a resource manager of a network a service quality request from an end device;
   approving at the resource manager the service quality request received from the end device;
   transmitting (a) data corresponding to authorization information associated with the approval of the service quality request and (b) signature key information from the resource manager to the end device;
   transmitting the authorization information from the resource manager to a network access device of the network;
   the end device combining the received signature key information with the received data corresponding to the authorization information in order to determine the authorization information;
   the end device including the determined authorization information in a communication data flow transmitted from the end device to the network access device;
   the network access device determining based on the authorization information included in the communication data flow received from the end device whether the communication data flow is authorized to be transmitted through the network with a quality of service; and
   if the communication data flow is determined to be authorized, then transmitting the communication data flow from the network access device into the network with the quality of service.

2. The method of claim 1, wherein the communication data flow includes service quality information, and wherein the service quality information is used to determine the quality of service.

3. The method of claim 1, wherein the network access device performs said determining based on the authorization information whether the communication data flow from the end device is authorized by comparing the authorization information in the communication data flow from the end device with the authorization information received from the resource manager.

4. The method of claim 1, further comprising:
   receiving a second communication data flow onto the network access device, the second communication data flow including second authorization information;
   determining on the network access device, based on the second authorization information in the second communication data flow, that the second communication data flow is not authorized to be transmitted through the network with the quality of service; and
   modifying the second authorization information in the second communication data flow and transmitting the modified second communication data flow from the network access device and into the network.

5. The method of claim 4, further comprising:
   registering the second authorization information in the second communication data flow as invalid.

6. The method of claim 1, wherein the authorization information in the communication data flow is data-flow-specific.

7. The method of claim 1, wherein the authorization information in the communication data flow is communication-device-specific.

8. The method of claim 1, wherein the authorization information in the communication data flow is service-quality-specific.

9. The method of claim 1, wherein the network includes a resource manager that generates the authorization information, and wherein the communication data flow is transmitted from an end device to the network access device, and wherein the resource manager transmits the authorization information to the end device using a secured transmission protocol.

10. The method of claim 1, wherein the network access device receives the signature key information from the resource manager, the network access device using the signature key information to make said determination based on the authorization information included in the communication data flow received from the end device whether the communication data flow is authorized to be transmitted through the network with the quality of service.

11. The method of claim 1, wherein the end device uses time information to determine the authorization information.

12. The method of claim 1, wherein the authorization information is carried in a packet header of a packet of the communication data flow.

13. The method of claim 12, wherein a flag in the packet header indicates whether authorization information is included in the communication data flow transmitted from the end device to the network access device.

14. The method of claim 1, wherein the authorization information is transmitted in a standardized RTP (real time protocol) extension to a packet header of a packet of the communication data flow transmitted from the end device to the network access device.

15. The method of claim 1, wherein the authorization that the communication data flow from the end device is authorized to be transmitted through the network with the quality of service accords with an RTP (real time protocol) protocol, and wherein this authorization also authorizes a data flow according to an RTCP (real time control protocol) protocol allocated to the communication data flow.

16. The method of claim 1, wherein a second communication data flow includes service quality information, and wherein the service quality information in the second communication data flow is used to determined a quality of service with which the second communication data flow is transmitted through the network, and wherein if the network access device determines that the second communication data flow is not authorized to be transmitted though the network with the quality of service then the network access device overwrites the service quality information before sending the second communication data flow on into the network.

17. A system, comprising:
a resource manager that receives a service quality request from an end device, approves the service quality request, and in response supplies (a) data corresponding to first authorization information and (b) signature key information to the end device;
the end device combining the received signature key information with the received data corresponding to the first authorization information in order to determine the first authorization information, and transmitting a communication data flow along with the first authorization information determined from the data received from the resource manager; and
a network access device that receives second authorization information from the resource manager and receives the communication data flow from the end device, including the first authorization information included by the end device, the network access device using the first authorization information in the communication data flow and the second authorization information to determine whether the communication data flow from the end device is authorized to be transmitted into a network with a first quality of service, wherein if the network access device determines that the communication data flow is authorized to be transmitted into the network with the first quality of service then the communication data flow is transmitted from the network access device and into the network with the first quality of service, but if the network access device determines that the communication data flow is not authorized to be transmitted into the network with the first quality of service then the communication data flow is transmitted from the network access device and into the network with a second quality of service.

18. The system of claim 17, wherein the first authorization information is identical to the second authorization information.

19. The system of claim 17, further comprising:
a gate keeper device, the gate keeper device communicating (a) the data corresponding to the first authorization information and (b) the signature key information from the resource manager to the end device.

20. A system, comprising:
a resource manager that generates authorization information and transmits (a) data corresponding to the authorization information and (b) signature key information to an end device;
an end device that combines the received signature key information with the received data corresponding to the authorization information in order to determine the authorization information, and inserts the authorization information received from the resource manager into a packet of a communication data flow transmitted by the end device; and
means for using the authorization information in the communication data flow transmitted by the end device to determine whether the communication data flow is authorized to be transmitted through a network with a predetermined quality of service, wherein the means receives the authorization information from the resource manager and receives the communication data flow from the end device, wherein the means is located on the network, and wherein the end device is located outside the network wherein if the means determines that the communication data flow from the end device is authorized to be transmitted through the network with the predetermined quality of service then the communication data flow is transmitted through the network with the predetermined quality of service, but if the means determines that the communication data flow is not authorized to be transmitted through the network with the predetermined quality of service then the communication data flow is transmitted through the network with a lower quality of service.

21. The system of claim 20, wherein the end device inserts a service quality request into the communication data flow, and wherein the service quality request requests the predetermined quality of service.

\* \* \* \* \*